United States Patent [19]
Riordan et al.

[11] 3,708,214
[45] Jan. 2, 1973

[54] SKID CONTROL VALVE ASSEMBLY

[75] Inventors: Hugh E. Riordan, Ann Arbor; Peter Every, Livonia; Frank E. Hill, Westland, all of Mich.

[73] Assignee: Kelsey-Hayes Company, Romulus, Mich.

[22] Filed: Aug. 6, 1970

[21] Appl. No.: 61,620

[52] U.S. Cl. .................. 303/21 F, 92/113, 303/6 C, 303/61
[51] Int. Cl. ............................................. B60t 8/08
[58] Field of Search...137/543.21; 188/181; 303/6 C, 303/20, 21 F, 21 BE, 21 P, 61; 92/113; 251/30, 61.5

[56] References Cited

UNITED STATES PATENTS

| | | | |
|---|---|---|---|
| 3,554,612 | 1/1971 | Harned | 303/21 F UX |
| 3,441,320 | 4/1969 | Flory | 303/21 F UX |
| 3,499,689 | 3/1970 | Carp et al. | 303/21 P |
| 3,486,800 | 12/1969 | Ayers, Jr. | 303/21 F |

Primary Examiner—Milton Buchler
Assistant Examiner—Stephen G. Kunin
Attorney—Harness, Dickey & Pierce

[57] ABSTRACT

A skid control valve assembly including a force motor assembly for controlling the skidding of a vehicle under braked conditions, the force motor assembly being provided with variable duty cycle pulses from a control system which provides a signal wave form to control the position of the fluid pressure controlling device in one of three conditions; the first being "dump" mode of operation wherein the force motor is controlled to preclude braking pressure from being supplied to the wheels of the vehicle, the "hold" made of operation where in the braking force present at the time the system goes into the hold mode of operation is maintained, and the "return" mode of operation wherein braking pressure is returned to the vehicle wheels.

The control system is effectively responsive, during the deceleration portion of the wheel cycle, to a critical slip signal, the signal being generated in response to a sensed difference between a hypothetical vehicle deceleration, as approximated by a decreasing ramp signal, and the vehicle wheel speed. The system is also responsive during the acceleration portion of the wheel cycle, to the sensing of certain conditions of a wheel acceleration signal and a change in sign of the rate of change of wheel acceleration. The signal from the circuit described above is fed to a logic circuit which controls the operation of a variable duty cycle pulse generator, the duty cycle of the pulse generator being modulated in accordance with the sensed condition at the wheel, the initial, increasing portion of the duty cycle range creating the dump mode of operation, the intermediate, constant range duty cycle creating the hold mode of operation and the final, decreasing duty cycle range providing the return mode of operation.

The force motor includes a movable element in the form of a nonferrous cup and coil which may be operated in two fixed positions and a third variable position, the coil being energized with the variable duty cycle pulses to cause the pressure controlling plunger to be either in the return or deactuated position where no signal is provided from the control circuit or a decreasing-to-a-minimum duty cycle signal, a skid signal or dump mode of operation which disconnects the manually actuated brake cylinder hydraulically to the wheel cylinders to provide substantially zero braking pressure, and the hold position which maintains the pressure being fed to the wheels at the time the hold position is achieved. This latter position is actually a range of positions for the armature, the position being selected as a function of the position of the armature when the hold mode is entered.

20 Claims, 4 Drawing Figures

United States Patent [19]
Riordan et al.

[11] 3,708,214
[45] Jan. 2, 1973

SKID CONTROL VALVE ASSEMBLY

BACKGROUND AND SUMMARY OF THE DEVELOPMENT

This invention relates generally to vehicle braking systems and, more particularly, to a brake control valve assembly for preventing wheel skidding and minimizing stopping distances while maintaining directional stability through a system which senses, on the run-down portion of the cycle, a critical slip and, on the spinup side of the cycle, a positive wheel acceleration and a change in sign of the rate of change of the wheel acceleration signal to produce a varying duty cycle output control signal which is utilized to control the force of the armature of a force motor connected in pressure controlling relation with a wheeled vehicle braking system.

For purposes of describing the system of the present invention, the term "slip" refers to a characteristic of the rotating element whereby the element rotates at less than its free rolling speed when a braking force or torque is applied. In the context of the system, this slip may be approximated by a hypothetical measure of the vehicle speed in comparing this vehicle speed to a wheel speed. The term "skid" or "slide" refers to a locked wheel condition.

One of the major difficulties which arises in braking a moving vehicle, such as an automobile, an aircraft or other wheeled vehicle, occurs when the braking wheel, or wheels, skid or slide, this skid tending to create an unstable condition in the controlled motion of the vehicle. Wheel lockup may cause such a loss in directional stability as to result in an uncontrolled skidding or sliding while at the same time the presence of locked wheels generally increases the distance required to stop due to the reduced coefficient of friction while skidding.

Several skid control systems have evolved which are effective under various road conditions to minimize stopping distance while maximizing the directional stability of the vehicle. For example, one system is disclosed in copending application of David B. Eisenhaure and Ronald S. Scharlack, Ser. No. 626,626, now U.S. Pat. No. 3,508,795 issued Apr. 28, 1970 which utilizes the linear and angular accelerations of the braking wheel as sensed by appropriate acceleration devices. Another such system is disclosed in copending application of Ronald S. Scharlack, Ser. No. 854,876, filed Sept. 3, 1969, which discloses a critical slip sensing system and a logic circuit to detect when the system is in a critical slip or when a positive wheel acceleration signal exists in conjunction with a change in sign of the rate of change of wheel acceleration from a positive to a negative value.

This latter system is utilized, in conjunction with additional logic circuitry, to provide a three mode control signal which is utilized to control the force motor, and the armature associated therewith, in three modes of operation, the dump, the hold and the return mode of operation.

It has been discovered that, contrary to previous system concepts, that a braking system may be used most efficiently if, upon sensing of the acceleration or spinup of the wheel, that the brake pressure be held at a particular value rather than dropping the brake pressure down by continuous dumping of brake pressure. Since the wheel is already starting the spinup portion of the cycle, it is not necessary to further dump brake pressure. Rather, it is the purpose of the present system to hold the brake pressure at the particular value at which spinup will occur and reapply brake pressure upon the sensing of the inflection point on the spinup side of the cycle. At this inflection point, the brake pressure is again applied (the return mode) to cause the wheel to decrease its rate of change of acceleration and finally achieve the run-down or decelerating portion of the cycle. Prior to the achieving of the critical slip point, the brake pressure is returned to the wheels at a preselected rate of return.

For purposes of this discussion, the portion of the cycle between the application of brake pressure initially and the sensing of the critical slip point will be referred to as the preskid portion of the cycle. The portion of the cycle between the critical slip point and the start of the spinup of the wheels will be called the skid portion of the cycle. The portion of the cycle between the start of spinup and the sensing of the inflection point at which the rate of change of acceleration changes sign will be called the acceleration mode of operation and the final portion of the cycle between the inflection point and the top of the spinup portion of the cycle will be called the post-inflection portion of the cycle. The system then achieves the preskid portion.

In the system of the present invention, a control signal is generated which is a series of pulses having a duty cycle which varies in accordance with the particular mode of operation to be utilized in controlling the braked wheel. In controlling this system of the present invention, the duty cycle is varied from a zero level before the application of brake pressure to a preset low level during the preskid mode. The duty cycle is then caused to steadily increase during the skid mode to a constant duty cycle level during the acceleration mode of operation. The duty cycle is slowly decreased at a constant rate during the post-inflection mode of operation.

These pulses are utilized to energize the triple-mode valve assembly of the present invention to pulse the armature thereof, and thus modulate the pressure applied in the control chamber on one side of the main diaphragm assembly. The pulses may be of a relatively high frequency wherein the atmosphere-vacuum control valve pulses or modulates at a rapid rate to position the main diaphragm assembly in the desired control location. In certain assemblies, the pulse frequency may be lowered to permit the diaphragm assembly to modulate slightly. In this case, the wheel brake inertia is sufficient to avoid modulation of the brake force actually applied to the wheel.

Accordingly, it is one object of the present invention to provide an improved system for operating the brakes of a wheeled vehicle.

It is another object of the present invention to provide an improved skid control valve assembly for the brake or brakes of a wheeled vehicle.

It is still a further object of the present invention to provide an improved brake control assembly of the type described which is capable of eliminating skidding or sliding of the brake wheel including a provision for holding the brake pressure during a predetermined portion of the wheel velocity cycle.

It is still another object of the present invention to provide an improved triple mode skid control valve assembly which includes an improved skid sensing system.

It is still a further object of the present invention to provide an improved skid control valve assembly incorporating an improved low inertia force motor assembly.

It is still a further object of the present invention to provide an improved skid control valve assembly which incorporates a control valve for modulating the pressure or vacuum applied to the control chamber by pulsing the control valve.

It is still a further object of the present invention to provide an improved triple mode skid control valve assembly which generates a critical slip signal and responds to a function of the wheel speed and hypothetical vehicle speed signal.

It is still another object of the present invention to provide an improved skid control system incorporating three modes of operation, a dump, hold and return mode.

It is another object of the present invention to provide an improved skid control valve assembly for use in connection with a skid control system which correlates the first and second derivative of the wheel speed signal and also a critical slip signal to control the operation of a triple mode valve.

It is still a further object of the present invention to provide an improved skid control valve assembly which is reliable in use, inexpensive to manufacture and easily installed.

Further objects, features and advantages of this invention will become apparent from a consideration of the following description, the appended claims and the accompanying drawings in which:

It is to be understood that the skid control valve assembly of the present invention is particularly adapted to be utilized and will be described specifically for use with an automotive vehicle. However, it is to be understood that the features of the invention may be utilized with other types of vehicles including aircraft and other wheeled vehicles which are adapted to provide braking through a wheel type of element. In the case of an automotive use, the assembly of the present invention may be utilized in connection with either the front wheels, the rear wheels or both the front and rear wheels. However, for simplicity, the system will be described for use in conjunction only with the rear wheels of an automotive vehicle.

Figure 1:
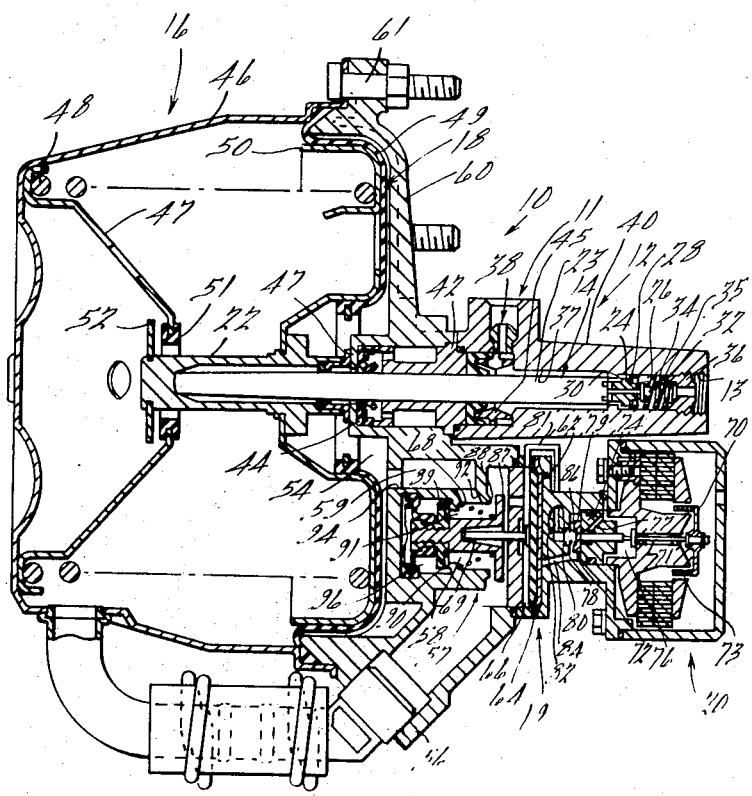
FIG. 1 is a cross-sectional view of a preferred form of triple-mode, force motor and control valve for use in connection with the circuit of FIG. 4, as taken along line 1—1 of FIG. 2.
Figure 2:
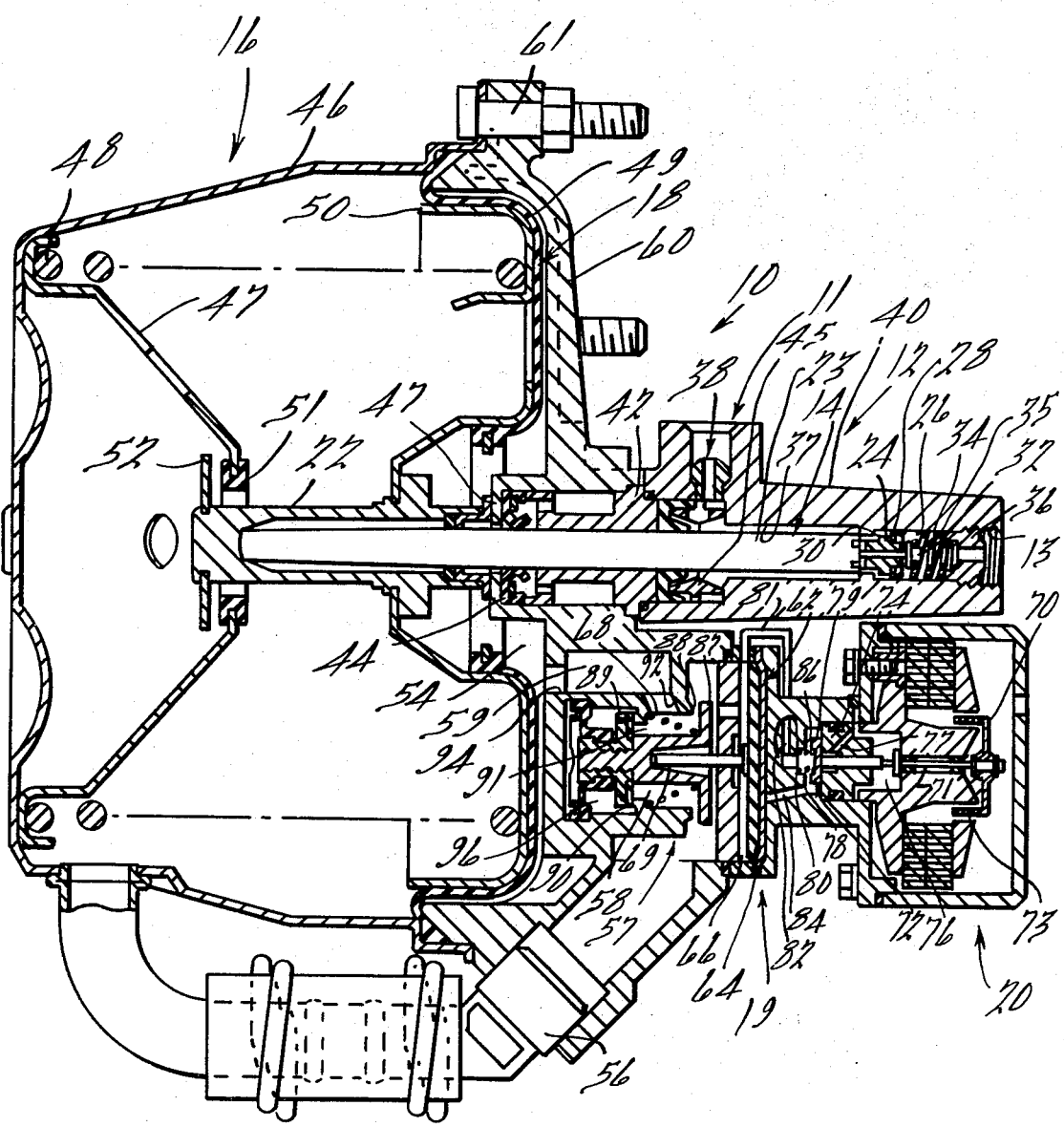
FIG. 2 is a perspective view of the force motor and valve assemblies.
Figure 3:
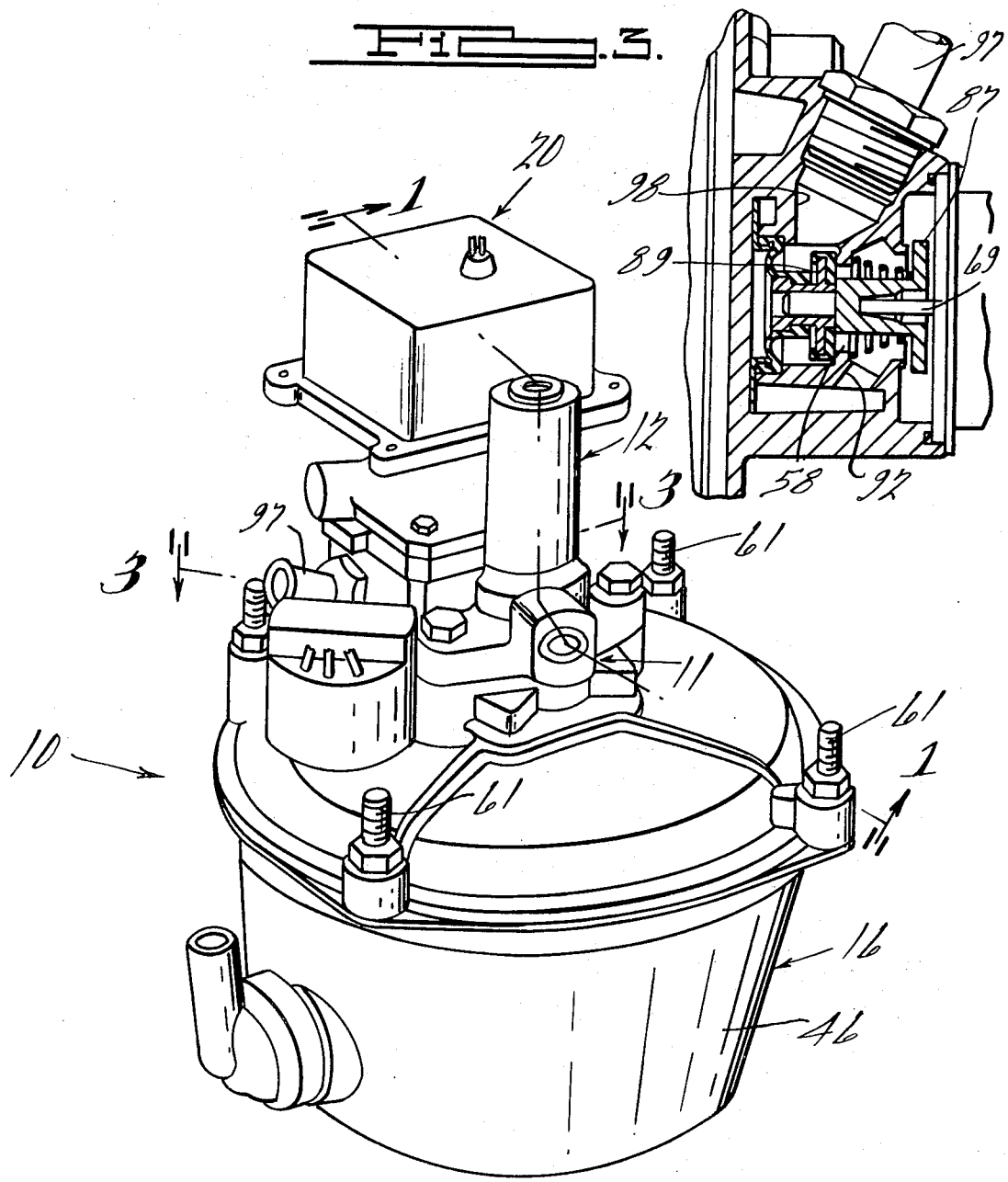
FIG. 3 is a cross-sectional view of FIG. 2, taken along line 3—3 thereof.

The output, variable duty cycle generator circuit will be described in connection with the description of FIG. 4. However, for purposes of a description of FIGS. 1 to 3 the duty cycle of the pulses fed to the force motor are at a low ready level upon application of the brakes. The duty cycle is then increased during the skid portion, is held steady during the acceleration portion and is decreased during the post inflection portion. The significance of these relative signal duty cycles during the various portions of the wheel cycle will become apparent from a description of a preferred form of triple mode valve assembly to be described in conjunction with FIGS. 1-3. Referring now to FIGS. 1-3, there is illustrated a valve control assembly 10 which is utilized to control the application of fluid brake pressure to the wheel cylinders connected to a fluid output assembly 11, the pressure at the outlet port of assembly 11 being controlled by means of a hydraulic cylinder assembly 12. The input to the hydraulic cylinder assembly 12 is provided by means of a hydraulic line (not shown) connected to an inlet port 13 and a hydraulic piston 14. The position of the piston 14 is controlled by a diaphragm assembly 16, which, at its initial or rest balanced position, is provided with vacuum on either side of a diaphragm assembly 18. The vacuum source preferably is closely regulated to provide a constant, high capacity vacuum source. The vacuum or atmospheric pressure on the right side of the diaphragm assembly 18 is controlled by means of a control module 19, the control module 19 being in turn controlled by a force motor assembly 20.

In general, in the dump mode of operation, atmospheric pressure is supplied to the right side of the diaphragm assembly 18 by pulsing a valve assembly 57 with the appropriate duty cycle to force the piston 14 to the left thereby closing the fluid passageway between inlet port 13 and outlet port 11. The closure of valve assembly 57 disconnects the brakes from the master cylinder. Further motion of the plunger 14 increases the volume of the chamber 37. This removes brake pressure from the wheel cylinders to permit the wheels to spinup. On the other hand, when it is desired to go into the hold mode of operation, the valve assembly 57 is rapidly pulsed to trap the pressure in the right side of the diaphragm assembly to hold the plunger 14 at the position reached when the hold mode of operation was signaled. Finally, in the return mode of operation, the pulses of current to the force motor assembly 20 are varied and the system achieves the position shown in FIGS. 1-3 to force the plunger 14 to decrease the volume of chamber 37 and return brake pressure to the wheel cylinders. Further motion to the right opens the valving between the inlet port 13 and the output port 11.

Referring specifically to the details of the operation of the hydraulic piston 14, the position of the piston 14 is controlled by the diaphragm assembly through movement of a sleeve 22 as will be hereinafter explained. When the cup shape housing 22 moves to the left, the piston 14 will also move to the left due to the hydraulic pressure being exerted by the brake pressure through valve 38. The right end 23 of the piston 14 supports a valving assembly which includes a main poppet valve 24 which is slidably supported within bore 26 by means of a washer element 28. The initial movement of the piston 14 to the left permits a shoulder element 30 on the poppet valve body 24 to engage a valve seat to close off fluid flow around the valve body 24. Further movement of the piston element 21 permits a bleeder valve 32 to close over a port (not shown), the valve 32 being slidably supported by means of a stem 33 mounted within a bore of the main valve body 24. In addition to the hydraulic pressure, the valve elements 24 and 32 are biased to the left by means of spring elements 34, 35 which are seated at one end thereof against a plug element 36 supported within the bore 26. The bleeder valve 32 may be eliminated from the assembly, if desired.

In the position shown in FIG. 1, fluid flow will enter the port 13, flow through the bore of the plug element 36, through the valve assembly, including valve bodies 24, 32, through the bore 37 and through the outlet port 11 by means of an outlet port assembly 38. The piston 14 is supported in sliding relation to the main body 40 by means of a bearing element 42 which is fixedly supported within the housing of the diaphragm assembly 16. Suitable sealing washers 44, 45 are provided to seal the piston 14 in its sliding movement.

As was stated above, the initial movement of the piston 14 to the left moves the main valve body 24 to the left to seat the valve body against the valve seat 31. Upon further movement of the piston element 14, the second valve body 32 moves into engagement with the main valve body to completely shut off the hydraulic pressure to the wheel cylinders. Upon return of the piston 14 to the right, the opposite action occurs.

Referring to the specific details of the diaphragm assembly, the assembly includes a main diaphragm housing 46, the interior of which is connected to a source of vacuum (not shown) which generally is supplied by the engine vacuum system. The interior of the housing 46 is provided with a bell shaped support member 47 which is utilized to support one end of a spring 48, the other end of the spring being biased against the interior of a diaphragm element 49 by means of a second support element 50. The bell shaped member 47 includes, at its apex, an annular resilient washer element 51 which provides a stop for one direction of movement of the housing 22. The end of the housing 22 includes a washer element 52 which is adapted to position itself against the annular washer 51 when the housing element is initially assembled. The interior of the housing is connected to a vacuum source as described above and the other side of the diaphragm element is in fluid communication with a control chamber 54, the control chamber also being provided with vacuum through a pipe 56 connected at one end to the interior of the housing 46 and at the other end to the control chamber through a valving arrangement to be described hereinafter. Sufficient to say at this time that the vacuum is communicated to the control chamber through the valve assembly 57, a chamber 58 and a conduit 59 formed in the housing for the valve assembly 57. Thus, in the normal situation, with the valve assembly 57 in the position shown, both sides of the diaphragm assembly are connected to vacuum to provide a rest position for the diaphragm.

The top of the housing 46 is closed by means of an end bell assembly 60 which is bolted to the housing 46 by means of a plurality of fastener assemblies 61. The end bell assembly 60 also supports the hydraulic piston 14. For other details of this valve and diaphragm assembly, specific reference is made to copending application of William Stelzer, Ser. No. 702,095, filed Jan. 31, 1968 now U.S. Pat. No. 3,495,882 issued Feb. 17, 1970 the specification of which is incorporated herein by reference.

Referring specifically to FIG. 1, the force motor assembly 20 is utilized to control the position of a second diaphragm assembly 62. Specifically, the diaphragm assembly 62 includes a diaphragm 64 and a pair of chambers 66, 67 (the chamber 67 being collapsed in the illustrated arrangement and not seen) positioned on either side of the diaphragm 64. The diaphragm 64 is positioned in its illustrated location by means of a spring element 68 in the chamber 58 which acts against a shaft 69 through the valve assembly 57. A movable member 70 is mounted directly on a shaft 71 which is connected in operative relation to open and close a valve assembly 72 and includes a coil 73 which is energized from the source of pulses.

The valve assembly 72 comprises a valve seat body 74 which is mounted within a cavity 76, the cavity 76 being supplied from a source of air through suitable filters (not shown). The valve body 74 includes a passageway 77 for communicating the chamber 76 with a second chamber 78, the flow of air from the chamber 76 to the chamber 78 being controlled by a valve element 79. The valve element 79 is held against the valve seat formed on body 74 by means of a spring member 80. The chamber 78 is also supplied from a source of vacuum by means of a tubular element 81 and a passageway 82, the tubular element being supplied from the same vacuum source supplying the chamber 66. The vacuum source is communicated with the opposite side of the diaphragm 64 by means of a passageway 84.

Accordingly, when coil 73 is energized with current pulses, the duty cycle of the pulses is insufficient to move the movable element 70 and thus the valve element 79 is held against the valve seat formed by body 74 by the spring element 80. After the skid portion of the cycle is initiated, the duty cycle of the current pulses being fed to the coil 73 are steadily increased to cause the valve element 79 to pulse in accordance with the frequency of the pulses being fed to the coil 73. The pulsing of the valve element modulates the vacuum being supplied from the source through tube 81 and passageway 82, the vacuum alternately being shut off and recomunicated by the valve element 79 seating against the opposite face 86. When the valve element 79 is against the face 86, the source of air through passageway 77 is communicated with the chamber 78 and thus passageway 84 to the right side of the diaphragm element 64. This creates a pressure differential across the diaphragm to cause the diaphragm to alternately move to the left and right in accordance with the pulses being fed to the coil 73. The valve element 79 is sufficiently low in inertia to generally follow the pulses being fed to the coil 73. These pulses generally are in the range of approximately 25 cycles per second up to several hundred cycles per second. In one preferred embodiment, it has been found that at 60 cycles per second it will operate satisfactorily.

The movement of the diaphragm 64 causes the shaft 69 to move accordingly. The movement of shaft 69 back and forth causes the valve assembly 57 to operate in accordance with the pulses being fed to the coil 73. The valve assembly 57 generally includes a first valve element 87 which is adapted to seat against a valve seat 88 and a second valve element 89 which is adapted to seat against a valve seat 90. Thus, the valve assembly 57 controls the pressure in control chamber 54 by controlling the pressure in a chamber 91, which is communicated with the chamber 54 by means of a passageway 92, the passageway 59 and a second passageway 94.

When the shaft 69 has moved to the left, the valve element 87 is positioned against the valve seat 88 to discontinue the communication of the vacuum source 56 to the chamber 58. Also, the valve 89 is moved away from the valve seat 90 to communicate a chamber 96 with the chamber 58. The chamber 96, as is best seen from FIG. 3, is communicated with an air source through a chamber 98 and a conduit 97, this air source being communicated with the chamber 58 when the valve 89 is opened.

In the higher range of frequencies, the pressure change in control chamber 54 is insignificant in response to the pulses being fed to the coil 73. Accordingly, the diaphragm assembly 18 will be positioned in accordance with the pressure being communicated with the chamber 54. On the other hand, in the lower frequency range of pulses, the diaphragm is able to somewhat follow the pulsing provided coil 73. Thus, the diaphragm 18 will move slightly in response to the pulses being fed to the coil 73. However, the wheel assembly, particularly the springs connected to the brake shoes and the brake shoes themselves, have sufficient lost motion and inertia that the wheel will not experience a change in force in response to a slight modulating change in the position of diaphragm 18.

Figure 4:
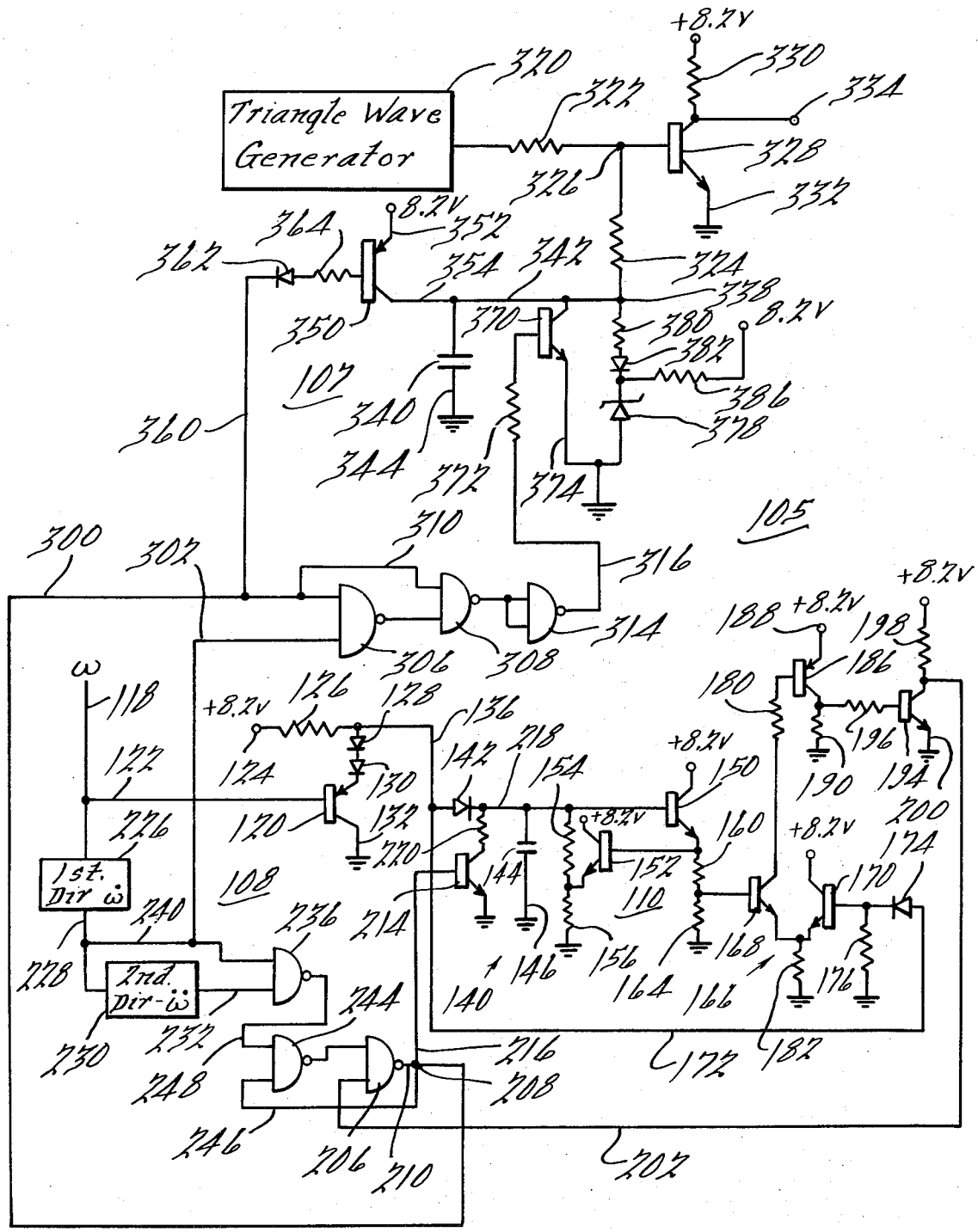
FIG. 4 is a schematic diagram illustrating the features of the novel skid control system of the present invention.

Referring now to FIG. 4, there is schematically illustrated a control system which includes an output circuit 107 to generate a series of output pulses at an output terminal thereof, the duty cycle of the pulses being controlled in accordance with the particular wheel velocity being sensed during the braking cycle of the wheel. This wheel velocity is sensed by means of a logic circuit 108 which is responsive to both the first and second derivative of the wheel angular velocity and also to a critical wheel slip signal which is generated by means of a critical slip circuit 110.

Referring particularly to the critical slip circuit 110, the circuit is utilized to control the release of the brakes on the run-down portion of the stopping cycle and the wheel acceleration and rate of change of wheel acceleration signal generating circuit 108 is utilized in reapplying the brakes. Particularly, the circuit 110 includes an input from a wheel velocity sensing transducer (not shown) which provides a wheel velocity input signal of omega ($\omega$) to an input conductor 118. This signal is fed to an input amplifier transistor 120, and particularly to the base electrode thereof, by means of a conductor 122. The emitter-collector circuit of the transistor 120 is connected to a positive source of d.c. potential at terminal 124 through a resistor 126 and a pair of diodes 128 and 130. The collector electrode of transistor 120 is grounded at 132.

The transistor 120 is biased such that the entire wheel velocity signal, as illustrated in FIG. 2 of the aforementioned copending application Ser. no. 854,876 and hereinafter referred to as the wave or wave form, is transmitted through the output conductor 136 connected to the junction between the upper diode 128 and the resistor 126. The diagram of the aforementioned copending application illustrates a portion, and particularly one cycle, of the wheel velocity signal as impressed on conductor 136. The wave form is seen to be a damped oscillatory wave which is generally symmetrical about a decreasing straight line having a negative slope. The wheel velocity signal or wave form impressed on conductor 136 is fed to a vehicle speed ramp generating circuit 140. The circuit 140 generates a ramp voltage which nearly approximates the actual vehicle speed. This ramp voltage may be selected to be of any configuration desired and, in a particular illustrated embodiment, the ramp is chosen to correspond to one unit of gravity deceleration rate of the vehicle.

Particularly, the signal on conductor 136 is fed through a diode 142 to a capacitor 144, the opposite plate of the capacitor being grounded at 146. Thus, as long as the voltage on conductor 136 exceeds the voltage on capacitor 144, the current will be fed to the capacitor 144. Thus, the capacitor is initially charged to a voltage which is representative of the unbraked wheel speed.

For purposes of this discussion, the wheel velocity will be considered to be a damped oscillatory wave which oscillates about a relatively straight line having a negative slope, as described above. Further, the portions of a single cycle of the wheel velocity wave will be referred to as described above, i.e., the preskid portion, the skid portion, the acceleration portion, and the postinflection portion. These portions of the cycle have been described in the preamble of this specification.

Accordingly, from the foregoing copending application illustrating the wave, it is seen that the vehicle speed curve initially starts at a flat constant value which, after the wheel is braked, commences deceleration during the preskid portion of the cycle. Accordingly, the capacitor 144 is charged to a voltage which is a function of the wheel velocity during this relatively flat portion of the preskid portion of the cycle. Upon deceleration of the wheel toward the critical slip point, the wheel velocity signal is less than the charge on capacitor 144 due to the slow discharge circuit of capacitor 144 to be described hereinafter. Accordingly, the discharge circuit of capacitor 144 will cause the voltage on the capacitor to follow a hypothetical straight line which hypothetically approximates the car velocity, in this case a one gravity deceleration. However, the wheel velocity is rapidly decreasing due to the brake force applied to the wheel.

This capacitor discharge circuit is seen to include a transistor 150 and a transistor 152. Also, a voltage divider circuit including a resistor 154 and a resistor 156 are included in the discharge circuit. Particularly, the current flows through the base-emitter circuit of transistor 150, the base-emitter circuit of transistor 152 and then to ground through the resistor 156, the base-emitter drops create a constant voltage across resistor 154. Accordingly, a voltage is fed to a voltage divider circuit, including resistors 160, 164, the resistors 160, 164 being chosen to provide a preselected percentage of the vehicle velocity signal to one input circuit of a difference amplifier system 166. It is to be noted that the velocity signal being fed to the one input circuit of the difference amplifier 166 is directed through two diode drops, including diode 142 and the base-emitter circuit of transistor 150. This signal is fed to the base circuit of transistor 168 of the difference amplifier 166. The use of a percentage vehicle velocity signal is optional and other systems may be utilized.

On the other hand, the wheel velocity signal is also fed to the other input terminal of the difference amplifier circuit 166, and particularly to the base circuit of a transistor 170 through a conductor 172 and diode 174. This voltage is developed across a resistor 176 which is connected between the base electrode of transistor 170 and ground. In this case, it is noted that the wheel velocity signal is directed through a single diode drop, particularly diode 174.

The difference amplifier circuit 166 is of the conventional type and includes an output circuit, in this case a current limiting resistor 180, and the two emitter electrodes of transistors 168 and 170 are connected to ground through resistor 182. Thus, when the vehicle velocity signal as fed to transistor 168 is sufficiently below the wheel velocity signal (in this case determined by the voltage divider resistors 160, 164 and the two diode drops across the diode 142 and the transistor 150 in the case of the vehicle velocity signal, and the voltage drop of the diode 174 in the case of the wheel velocity singal), the transistor 168 will be nonconductive and the transistor 170 will be conductive. However, when the wheel velocity signal drops by a preselected amount below the decreasing ramp voltage, the transistor 168 will be rendered conductive and the transistor 170 will be rendered nonconductive. This difference operation creates a critical slip signal which is a function of both of the wheel velocity and the vehicle velocity ramp signals.

When this critical slip is reached, the output signal from the transistor 168 is fed to an inverter amplifier transistor 188, the emitter of which is connected to a positive 8.2 volt potential at terminal 188 and the collector of which is connected to ground through a resistor 190. This critical signal causes transistor 186 to conduct to provide an output signal to a second inverter transistor 194 through a resistor 196. The second transistor 194 is connected to a positive potential through a resistor 198 and ground potential at 200. The conduction of transistor 186 causes normally nonconductive transistor 194 to conduct, thereby grounding the output conductor 202 connected to the collector electrode of transistor 194.

The signal on conductor 202 is fed to the circuit 108 and particularly to an nor gate which has the characteristics that two positive signals to the input thereof will create a logical zero output signal and all other signal conditions will create a positive or logical one output signal, as for example, in the case of a zero input or both inputs being zero. This output signal from gate 206 is fed to an output node 208 connected to the input circuit of the control system 107 to be described hereinafter. The control circuit 107 is utilized to control the output duty cycle being fed to a triple mode force motor and valve assembly to be described in conjunction with FIGS. 2 to 4.

In the particular embodiment illustrated, the output signal is fed back to a disabling transistor 214 through a conductor 216. This positive signal will cause the normally nonconductive transistor 214 to conduct, thereby grounding conductor 218 through the collector emitter circuit of transistor 214 and the resistor 220. This will rapidly discharge the capacitor 144 to disable the slip circuit. As will be seen from a further description of this system, the logic circuit, including gate 206, is designed to latch the output on until such time as certain conditions are sensed in the acceleration and rate of change of acceleration circuit 108. Thus, the disabling of the slip circuit will not effect the output signal being fed to the force motor. It is to be understood that the disabling circuit, including conductor 216, transistor 214 and the resistor 220, may be eliminated in certain configurations of skid control systems. Further, the critical slip circuit 110 described above is presented purely for illustrative purposes and it is to be understood that other similar types of critical slip circuits may be utilized to generate the signal being fed to the gate 206.

Referring now to the circuit 108, the wheel velocity signal omega ($\omega$) impressed on conductor 118 is fed to a first derivative circuit 226 which provides the derivative of the wheel velocity signal on output conductor 228. It is to be understood that the derivative circuit will be designed to provide the proper polarity of signals, in this case a noninverted output. The output from derivative circuit 226 is also fed to a second differential circuit 230 to provide a rate of change of wheel acceleration signal on the output conductor 232 and also inverts. This latter signal is fed to an output nor gate 236 which is utilized to correlate the first and second derivatives of the wheel velocity signal, the first derivative signal being fed to the gate 236 by means of a conductor 240.

As stated above, the critical slip circuit 110 provides a logical zero input signal to the gate 206 to provide a logical one output signal from the gate 206 on conductor 210. This output signal is also fed to the input circuit of a third gate 244 by means of a conductor 246. Thus, gate 244 is responsive to the signals on conductor 246 and a conductor 248. The input signal to gate 236 from the derivative circuit as impressed on conductor 240 is negative when the rate of change of wheel velocity signal is less than zero. On the other hand, the signal on conductor 240 is at a logical zero level when the omega dot ($\dot{\omega}$) signal is greater than zero. This corresponds to the first 180° and second 180° of the wheel velocity wave respectively.

It is to be noted that the omega dot, or wheel acceleration signal, is negative or less than zero for the entire first half of the wave. On the other hand, the rate of change of acceleration signal or omega double dot ($\ddot{\omega}$), as impressed on conductor 232, is positive during the first 90° of the wave form and is negative during the second 90° of the wave form. Accordingly, the signal on conductor 240 will be at a logical zero during the whole first half of the cycle and the signal on the conductor 232 will be at a logical one and switch to a logical zero.

The first derivative signal as supplied by derivative circuit 226 is normally zero and switches to a positive signal when the wheels accelerate. The signal on conductor 232 is normally at a logical zero and then switches to a positive level with a negative second derivative of the wheel velocity signal. Accordingly, during the preskid portion of the cycle, the first derivative signal on conductor 240 is a negative, the critical slip signal on conductor 202 is a positive level signal and the output from gate 236 is a logical one. During the skid portion of the cycle, the first derivative is a logical zero and the critical slip signal on conductor 202 is a logical zero. This renders the output on conductor 248 a logical one level and the output from gate 206 on conductor 210 at a logical zero level. During the acceleration portion of the cycle, the first derivative is a logical one level signal and the second derivative is a logical zero level signal. This maintains the output of gate 236, on conductor 248, at a logical one level and the output from gate 206 at a logical one level. During the post-inflection portion of the cycle, the first and second derivatives are a logical one level and the output of gate 236 on conductor 248 switches to a logical zero level, which renders the output from gate 206 at a logical zero level. The output gate 206, as impressed on node 208, is fed to a square wave pulsing circuit 107 by means of a conductor 300. Also, the first derivative signal on conductor 240 is also fed to the pulsing circuit 107 by means of a conductor 302. The two signals on conductors 300 and 302 are fed to the input circuit of an nor gate 306, the output of which is fed to a second gate 308. It is to be noted that the output of gate 206 is also fed forward from the conductor 300 to the input circuit of gate 308 by means of a conductor 310. The output of gate 308 is fed to an inverter circuit 314 to provide an output signal on conductor 316 in response to the signals being impressed on input conductors 300 and 302. The voltage on conductor 316 is normally low during the period that the brakes have not been applied or in the preskid mode of operation.

The circuit 107 includes a triangle wave generator system 320 which generates an output voltage having a wave form that increases along a straight line to a preselected level and then decreases to zero along a second straight line. The output of the triangle wave generator 320 is fed through a resistor 322 which forms, with a second resistor 324, a summing circuit. The output of the summing circuit, at node 326, is fed to the base electrode of an output transistor 328. The base electrode of the output transistor 328 is so biased, as will be hereinafter explained, that the triangle wave generated by circuit 320 will maintain the transistor 328 in the conductive state. The collector electrode of transistor 328 is connected to a source of positive potential through resistor 330 and the emitter electrode is grounded at 332. The straight line output during the preskid portion of the cycle is fed to an output terminal 334.

As was stated above, the resistor 324 forms a portion of the summing circuit, the voltage at resistor 324 being derived from a node 338. The node 338 is connected to a capacitor 340 by means of a conductor 342, the other plate of the capacitor 340 being grounded at 344. The capacitor 340 supplies a bias for the transistor 328 by means of the resistor 324, the voltage at node 338 being added to the voltage generator by the triangle wave generator. This voltage is sufficiently high to saturate the transistor 328 and maintain its conductive state during the initial application of the brakes.

The charge on capacitor 340 is supplied through the emitter-collector circuit of a transistor 350, the emitter electrode being connected to a source of positive voltage through a conductor 352 and the collector electrode being connected to the capacitor 340 by means of a conductor 354. The conduction of transistor 350, which is normally conductive, is controlled by the voltage impressed on conductor 300, this voltage being fed to the base electrode of transistor 350 by means of a conductor 360, a diode 362 and a resistor 364. The voltage on conductor 300 is normally low, and is of such a magnitude and polarity as to bias the transistor 350 in the normally conductive state. Thus, during the preskid portion of the operation of the braking system, the transistor 350 maintains a charge on capacitor 340.

As was stated above, the conductor 360 provides an output signal, this signal being fed to a discharge transistor 370, and particularly to the base electrode thereof, through a resistor 372. The collector electrode of transistor 370 is connected to the conductor 342, and thus in circuit with the capacitor 340, and the emitter electrode thereof is grounded by means of a conductor 374. The voltage at node 338 is also controlled by a circuit including a zener diode 378 which is connected to ground at one electrode thereof and is connected to the node 338 by means of a resistor 380 and a diode 382. The junction of the diode 382 and the zener diode 378 is connected to a positive source of d.c. potential by means of a resistor 386.

In operation, the signal on conductor 300 is at a logical zero level during the preskid portion of the cycle, is at a logical one level during the skid and acceleration portions of the cycle and is at a logical zero at the post-inflection portion of the cycle. On the other hand, the signal on conductor 302 is at a logical zero level during the preskid and skid portions of the cycle, and thus until the start of the run-up of the wheels. The voltage then switches to a logical one level from the start of the run-up portion of the cycle to the top of the run-up portion. Thus, the output of gate 306 is normally at a logical one level and the output of gate 308 is normally at a logical one level. Accordingly, the signal on conductor 316 will be at a logical zero level to maintain the transistor 370 in the nonconductive state. This condition maintains the voltage on capacitor 340 at a high level, this high level being added with the voltage being generated by the triangle wave generator circuit 320 to maintain the transistor 328 in the saturated state.

During the initial operation of the circuit, the signal on conductor 360 is relatively low to maintain the transistor 350 in the conductive state. Thus, the capacitor 340 is charged to a preselected maximum voltage and this maximum voltage contributes to maintaining the transistor 328 in the saturated state. Upon sensing the skid portion of the cycle, the output of gate 314 switches from a logical zero level to a logical one level to cause the conduction of transistor 370. Upon the occurrence of the conduction of transistor 370, the voltage at node 336 immediately drops to the zener avalanche voltage of the zener diode 378 due to the voltage being impressed thereon from the source of d.c. potential through the resistor 386. The lowering of the voltage to the zener avalanche voltage of node 338 causes the transistor 328 to drop out of saturation during selected portions of the signal being generated from the triangle wave generator 320. This causes a series of output pulses being generated at output terminal 334, which pulses have a fixed low duty cycle. The generation of the fixed duty cycle pulses readies the control device connected to the output terminal 334. In the particular illustrated embodiment, the control device takes the form of a force motor to be described in conjunction with FIGS. 1–3.

When the system achieves the skid mode of operation, the voltage output from gate 314 switches to a logical one level, the signal being fed by means of conductor 316 and resistor 372 to the transistor 370. This logical one signal causes transistor 338 to commence conduction, thereby completing a discharged path from the capacitor 340 to ground through the collector emitter circuit of transistor 370. It is to be noted that the transistor 370 is provided with a fixed bias, thereby fixing the current flow from the capacitor 340 through the collector emitter circuit of transistor 370. Thus, the capacitor discharges at a fixed linear rate to vary the voltage at node 338. This variation in voltage is summed with the output of the triangle wave generator 320 to vary the duty cycle of the pulses being generated at the output terminal 334. As is seen, the duty cycle steadily increases in accordance with the decrease in voltage or charge on capacitor 340.

When the acceleration portion of the cycle is reached, the voltage on conductor 316 drops to a logical zero level and the voltage on conductor 360 rises to a logical one level to cause transistors 370 and 350, respectively, to cease conduction. Thus, the voltage being fed to node 338 is held at a constant value to maintain the duty cycle of the pulses being generated by the transistor 328 at a constant level. This is the hold mode of operation.

Upon sensing the post-inflection point of the wheel velocity cycle, the voltage on conductor 360 drops to a logical zero level to cause transistor 350 to conduct. The conduction of transistor 350 creates a charging path from the direct current potential connected to conductor 352, through the emitter-collector circuit of transistor 350 and through the conductor 354 to the capacitor 340. The increasing charge on capacitor 340 is fed to the node 338 and summed with the wave form being generated by the triangle wave generator circuit 320. This causes the duty cycle of the output pulses being generated by transistor 328 to slowly decrease until such time as the zener voltage of zener diode 378 is achieved. At this time, the capacitor 340 is charged at a different rate due to the addition of the resistor 380, the diode 382, the zener diode 378 to the circuit. The capacitor 340 will then charge to the preskid voltage as described above. During the charging (or decreasing duty cycle) portion of the cycle, the output force motor and valve assembly is operated in the return node of operation.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a skid control assembly for controlling the fluid pressure generated force applied to the brakes of at least one wheel of a wheeled vehicle by a fluid force generating means from a source of brake actuating fluid pressure, and sensing means for sensing a speed condition of the vehicle, the improvement comprising a modulating valve assembly means including piston means actuable among three positions of operation, at least one of said positions being variable, said positions of operation comprising a return position wherein the brake actuating fluid source is substantially communicated with the brakes, a hold position wherein a portion of pressure from the source is communicated with the brakes for a controlled period and a dump position where the pressure generated force from the source is relieved from the brake, and a force motor assembly including piston means for actuating said valve assembly, among the three positions, said force motor including a low inertia coil adapted to be energized from a source of pulses having a varying characteristic which characteristic varies in response to variations in the vehicle wheel speed condition, the characteristic varying said mode of operation, said force motor assembly further including piston actuating means connected to said piston means for controlling the operation of said piston means, actuating means including a diaphragm and one of a source of pressure and a source of vacuum associated with one side of the diaphragm, and another source of vacuum and pressure associated with the other side of the diaphragm, the movement of the diaphragm being controlled by the application of a differential pressure across said diaphragm, said modulating valve assembly means including a control chamber in fluid communication with the other side of said diaphragm and a control valve assembly including said another source of vacuum and source of pressure operatively associated with said control chamber for controlling the position of said diaphragm, said control valve assembly including a first and second control valve, said force motor assembly including force motor means connected to said first and second valves and operative to control said valves and control the application of said differential pressure across said diaphragm.

2. The improvement of claim 1 wherein said modulating valve assembly means includes a valve disposed in fluid communication with said fluid source and said brake fluid pressure generating means.

3. The improvement of claim 1 wherein said diaphragm motor moves said valve to a first, second and third position in said return, hold, and dump modes respectively.

4. The improvement of claim 1 wherein said force motor assembly is connected to said valve assembly to control the operation of said valve assembly and the pressure applied to the other side of said diaphragm.

5. The improvement of claim 4 wherein said one side of said diaphragm assembly is supplied with one of the vacuum and pressure and the other side is, in the return position, supplied with said one of said vacuum and pressure.

6. The improvement of claim 5 wherein said other side of said diaphragm is supplied with the other of said vacuum and pressure to move said piston means to said dump mode.

7. The improvement of claim 6 wherein said valve assembly includes means for trapping the pressure in said control chamber to hold the pressure in said control chamber and move the piston to said hold mode.

8. The improvement of claim 1 wherein said first valve is associated with said another source of vacuum and said second valve is associated with said another source of pressure.

9. The improvement of claim 8 wherein one of said first and second valves is closed and the other of said first and second valves is open to apply a zero differential pressure across said diaphragm in the return position.

10. The improvement of claim 8 wherein said first and second valves are modulated by said pulses to trap a preselected differential pressure across said diaphragm in the hold mode.

11. The improvement of claim 10 wherein said preselected differential pressure is the pressure in said control chamber at the time said first and second valves are closed.

12. The improvement of claim 8 wherein one of the said first and second valves is open and the other of said first and second valves is closed to apply a positive differential pressure across said diaphragm in the dump mode.

13. The improvement of claim 12 wherein one of said first and second valves is closed and the other of said first and second valves is open to apply a zero differential pressure across said diaphragm.

14. The improvement of claim 13 wherein both said first and second valves are modulated by said pulses to trap a preselected differential pressure across said diaphragm in the hold mode.

15. The improvement of claim 8 wherein said force motor includes means for rapidly actuating said first and second valves to alternately communicate pressure and vacuum to said control chamber in said dump and hold modes.

16. The improvement of claim 15 wherein said force motor includes a cavity, a first and second valve, and a source pressure and vacuum, said first and second valve modulating said pressure and vacuum sources.

17. The improvement of claim 16 wherein said force motor further includes a diaphragm having a cavity in fluid communication with either side of said diaphragm, the operation of said first and second valves controlling the pressure differential across said diaphragm.

18. The improvement of claim 17 further including a field and armature assembly, the armature being operatively connected with said first and second valves, said armature being provided with a signal of either a first polarity across said field, a second polarity across said field or zero current through said field for said three portions.

19. The improvement of claim 15 wherein said control valve assembly further includes an intermediate chamber, said chamber being in fluid communication with said control chamber and selectively in communication with said pressure and said vacuum through said first and second valves.

20. The improvement of claim 19 wherein said force motor assembly includes a low inertia armature member connected to respond to said pulses with a linear reciprocal motion, said motion of said low inertia armature being communicated to said first and second valves to alternately communicate said pressure and said vacuum with said intermediate chamber, and in turn, to said control chamber.

* * * * *